United States Patent [19]

Hardin

[11] Patent Number: 5,193,489

[45] Date of Patent: Mar. 16, 1993

[54] ANIMAL LITTER

[75] Inventor: John Hardin, La Grange, Ill.

[73] Assignee: Laporte Inc, Rolling Meadow, Ill.

[21] Appl. No.: 907,381

[22] Filed: Jul. 1, 1992

[51] Int. Cl.$^5$ ............................................. A01K 29/00
[52] U.S. Cl. ..................................................... 119/173
[58] Field of Search ........................ 119/171, 172, 173

[56] References Cited

U.S. PATENT DOCUMENTS

| | | | |
|---|---|---|---|
| 4,009,684 | 3/1977 | Kliment et al. | 119/172 |
| 4,676,196 | 6/1987 | Lojek et al. | 119/172 |
| 4,881,490 | 11/1989 | Ducharme et al. | 119/173 |
| 5,101,771 | 4/1992 | Goss | 119/173 |

Primary Examiner—Gene Mavane
Assistant Examiner—Thomas Price
Attorney, Agent, or Firm—Kane, Dalsimer, Sullivan, Kurucz, Levy, Eisele and Richard

[57] ABSTRACT

The clumping ability of a poorly clumping earth is augmented by mixing the earth with a water soluble or dispersible gum selected from the galactomannan gums, e.g. guar gum or derivatives thereof and provides a useful animal litter. Preferably the earth and the gum are dry-mixed. Acceptable clumping performance may be achieved using as little as 0.05% of the polysaccharide by dry weight of the earth.

14 Claims, No Drawings

ANIMAL LITTER

BACKGROUND OF THE INVENTION

1. Field of the Invention

This invention relates to animal litter and to the production thereof. More particularly it relates to litter which is readily amenable to the removal of odorous animal waste products after use. It particularly relates, without limitation, to cat litter.

2. Brief Description of Related Art

Animal litter and the deodorising of animal litter which has been contaminated by animal waste products has been widely described in the literature. It is common practice to include additives in the litter during manufacture in order to mask or eliminate odours the additive possibly being a perfume or a substance capable of chemically altering the substance or substances responsible for the odour such as a reactive substance such as a suitable acid. Some expedients may be expensive to implement due to the cost of the additives and may often be only partially effective.

It has been realised that a property of certain natural earths which may be used as litter, namely a tendency to "clump", may be utilised to control litter odour. Clumping is a tendency, marked in certain earths and less marked or absent in others, for the earth particles to adhere firmly to each other when wet to form a mass having sufficient physical integrity to enable it to be removed from the remainder of the particles without undue crumbling or loss of peripheral material. The liquid with which the litter has been wet is entrained in the clump and is removed with it. Where the earth has good clumping properties substantially all of the liquid may be retained in the clump and the portion of the earth which remains after the removal of the clump may be completely dry. This property provides a means for removing urine from used litter which, in conjunction with the physical removal of feces, results in a residue of uncontaminated litter, free of undesired odours, which may be replenished with fresh litter. This represents an economical use of litter in comparison with the complete replenishment of the litter.

The present invention relates to the improvement of clumping properties in those earths which naturally show only poor or medium clumping properties. In selecting earths for use according to the invention the degree of clumping of any particular earth may be judged by reference to the results of the clumping test described hereafter. However, while the invention gives its greatest benefit when used in relation to poorly clumping earths, the invention is not limited to such and may be used in relation to any earths suitable for litter use. The earth may for example be a montmorillonite or other smectite, suitably in the alkaline earth metal form, an attapulgite, a palygorskite or a sepiolite.

U.S. Pat. No. 5,014,650 relates to litter comprising a porous, inert solid substrate, such as a clay, containing a cellulosic ether in an amount sufficient to agglomerate the animal urine deposited on the litter to form a gelled agglomerate having sufficient mechanical integrity to be conveyed from the litter box as a discrete entity. Additional polymers disclosed to be useful in the litter include polyvinyl alcohol, xanthan gum, gum acacia and various water-soluble polysaccharides although these, apart from the cellulose ethers, are neither preferred nor exemplified.

U.S. Pat. No. 4,676,196 describes an absorbent non-clay material comprising a mix of particulate materials which are caused to agglomerate to form non-compacted particles of a required size by tumbling in the presence of a moistened binder comprising starches, gums such as guar gum or glues. No materials known to have clumping effect are included in the absorbent material and the binder is included merely as an agglomerating agent.

SUMMARY OF THE INVENTION

The present invention provides an animal litter comprising a particulate earth substrate in admixture with a water soluble or dispersible polysaccharide selected from the galactomannan gums, said polysaccharide being present in an amount sufficient to increase the inherent clumping ability of the earth. By a galactomannan is understood a polysaccharide mainly or wholly consisting of mannose and galactose, and preferably comprising a chain of mannose units bearing galactose side-chains.

DETAILED DESCRIPTION OF THE INVENTION

The galactomannans may be selected according to the invention to be effective at relatively low concentrations and to give a fast clumping response. While the last-mentioned property might be regarded as unimportant it does, in fact, contribute to the economy of the litter in use since it assists in confining the urine to a relatively compact volume of the litter.

Vegetable based gums are usually marketed in a number of grades ranging from the relatively impure base gum, through purified gums from which some extraneous vegetable matter has been removed to derivatised gums which have been treated chemically to alter their characteristics in some way. While the base non-purified gums give good gelling performance it has been found that, in the context of the present invention, they yield clumps which are either not fully hard or take a relatively lengthy period of time to produce a hard clump. They may be used according to the invention but are not preferred.

The gums used according to this invention are preferably relatively purified and may be derivatised, e.g. by reaction with propylene oxide to form the hydroxy propyl ether, to augment their hydrophilic character. Purified gums derivatised to augment their hydrophilic character are particularly effective according to the invention. It is also preferred to use a gum which has been treated to reduce their alkalinity in aqueous dispersion or solution e.g. by the inclusion therein of a relatively weak organic or inorganic acid for example one having a pK value in aqueous solution of at least 4.0.

Preferably the galactomannan gum selected according to the invention is a guar gum or derivative thereof having one or more of the characteristics outlined above. This, or other galactomannan gum, when used in dry, particulate form as hereafter described, may contain a restricted quantity of water which is preferably present in less than 20% by weight and/or in a quantity which does not impair the flowability or handling qualities of the material.

The concentrations of cellulose ethers specifically disclosed to be effective in U.S. Pat. No. 5,014,650 range from 0.3% upwards with some failures at 0.5% by weight. The galactomannans used according to the present invention may give effective clumping at concentrations down to 0.05% by weight of the earth (dry weight) or below in certain instances and are preferably used in from 0.02% to 1% by weight although any larger quantities, for example up to 2.5% or more by weight, may be used without departing from the scope of the invention.

To prepare the litter of the present invention particles of the earth are preferably mixed with particles of the polysaccharide. The earth is suitably a relatively poorly clumping material, for example a Southeast US Fullers earth (calcium magnesium montmorillonite) other impure montmorillonite or other smectite or attapulgite. The earth preferably has a particle size mainly, for example at least 95% by weight, in the range of about 10 to 140 mesh, preferably about 18 to 100 mesh USS. The polysaccharide preferably has a similar size range. Surprisingly it has been found that the polysaccharide gums do not segregate unduly from the earth. The presence of the polysaccharide in particulate form appears to encourage swift dissolution or dispersion in liquid, in comparison with gum which might have been deposited onto the earth particles from solution, and therefore to encourage a quick clumping response. Mixing of the earth and the polysaccharide may be accomplished by any mixing device which is suitable for blending particulate solids without appreciably abrading them or otherwise causing an undue reduction in particle size, for example a double cone or V-shaped rotating tumble blender in a batchwise operation or cascaded variable speed screw devices feeding an internally mixed blend/-product hopper in a continuous mode.

The invention will now be illustrated by reference to the following examples of particular embodiments thereof.

In the Examples the tendency of an earth to clump was tested as follows. A flat pan was filled to a depth of 2 inches (5 cm) with a sample of the earth and the surface was levelled without compression. The pan was placed directly under the outlet of a vertically positioned burette containing the test liquid, which could be water, artificial urine or real urine, with the surface of the earth about ½ inch (1.25 cm) from the tip of the burette. The tap was opened and 30 ml of the liquid was allowed to flow onto the earth. After 1 minute, or in some instances the longer times of 2 hours or 18 hours, an attempt was made to lift out any clump which had formed using a dinner fork. This represented a stringent test of the integrity of the clump due to the relative narrowness of the fork in relation to the diameter of the clump. The clumping tendency of the earth was judged with reference to the qualities of the clump such as its size, shape, firmness and weight.

When certain Southeast US Fullers earths or attapulgite, without any additives to assist clumping, were subjected to the above test the clump formed usually had one or more of the following deficiencies:

(a) Insufficient strength to enable it to be lifted cleanly on the fork without loss of at least an appreciable quantity of peripheral dampened material.

(b) A flattened or "pancake" shape which makes it difficult to remove without breakage. The clump preferably has appreciable depth relative to its width.

(c) Undue largeness leading to a wastage of litter. The preferably below 80 g.

(d) Slowness in developing hardness. It is preferred that hardness develops very quickly, e.g. in 1 minute, to reduce spread of the liquid and thus clump size, or at least in well under 1 or 2 hours to allow removal before undue odour develops. This effect is preferably attained using a relatively small quantity of any additive which might be added.

EXAMPLE A (COMPARATIVE)

A predominantly calcium montmorillonite clay sample (comprising a blend primarily of montmorillonite and attapulgite having an overall particle size distribution of about 95% by weight, 30 to 60 mesh US Sieve was tested as a litter both as the raw clay, i.e. without additive, and as samples containing 2%, 5% or 10% by weight of Corn Starch which had been dry mixed into the clay. The test liquid was water.

The results of the tests were:

Raw Clay: Formed a soft clump which disintegrated under relatively low pressure although it could be lifted cleanly with care. The weight of the clump was 69.7 g.

With Corn Starch:
2% Clump of medium hardness. Tended to be dusty when poured into the box.
5% A hard clump formed. The product was extremely dusty when poured.
10% Again a hard clump formed. However the product was again extremely dusty when poured and the starch tended to separate.
It was concluded that this additive did not provide an acceptable litter product.

EXAMPLE B

A predominantly calcium montmorillonite clay comprising a blend of the same constituents as in the last examples but in differing proportions and having the same overall particle size distribution was tested as a litter both as the raw clay and as samples made by mixing various quantities of dry particulate guar products with the raw clay. The guar products were either the base polymer or derivatives thereof of augmented hydrophilic properties. The test liquid was water.

The hardness of clumping with reference to both the quantity of the galactomannan additive and the time which had elapsed since wetting was noted and is indicated in Table I.

TABLE I

| Additive | % | Clump hardness | | | Acceptable | Wt of clump g |
| --- | --- | --- | --- | --- | --- | --- |
| | | 1 min | 2 hrs | 16 hrs | | |
| Base Polymer | 1.0 | Med | Med | Hard | No | 57.2 |
| (unpurified) | 2.0 | Med | Med | Med-hard | No. — pancaked | 52.7 |
| Base | 1.0 | Hard | Hard | Hard | Yes | 56.4 |
| Polymer | 0.5 | Hard | Hard | Hard | Yes | 59.0 |
| (purified) | 0.25 | Med | Hard | Hard | Yes | 59.8 |
| Hydroxy | 1.0 | Hard | Hard | Hard | No. Sl pancake | 58.4 |
| propyl | | | | | | |
| derivative | 0.5 | Hard | Hard | Hard | Yes | 61.1 |
| (purified) | 0.25 | Med-hard | Hard | Hard | Yes | 60.1 |

TABLE I-continued

| Additive | % | Clump hardness | | | Acceptable | Wt of clump g |
|---|---|---|---|---|---|---|
| | | 1 min | 2 hrs | 16 hrs | | |
| | 0.125 | Med | Hard | Hard | Yes | 61.6 |
| | 0.10 | Med | Hard | Hard | Yes | 61.5 |
| | 0.05 | Med | Hard | Hard | Yes | 63.4 |
| | 0.02 | Soft-med | Hard | Hard | No | 64.0 |
| No additive | — | Med | Med | Med | No | 65.8 |

Sl = Slight
Med = Medium

It can be concluded from the above results that the propoxylated guar product was extremely effective in producing a product having excellent clumping qualities even when used in very small quantity. In tests using urine instead of water it was found that a 0.5% propoxylated guar treated clay gave acceptable clumping after only 1 minute with fully firm clumping after 2 hours and the residual urine smell was classed as "very slight" or "none".

I claim:

1. An animal litter, which comprises; a particulate earth substrate having at least poor clumping ability, in admixture with a water soluble or dispersible polysaccharide selected from the galactomannan gums, said polysaccharide being present in an amount sufficient to increase the clumping ability of the earth substrate.

2. An animal litter as claimed in claim 1 wherein the earth substrate is selected from the group consisting of the smectities, attapulgite, polygorskite and sepiolite.

3. An animal litter as claimed in claim 1 wherein the earth substrate has a particle size at least 95% by weight from 10 mesh to 140 mesh USS.

4. An animal litter as claimed in claim 1 comprising of a dry mix of the earth substrate with the polysaccharide.

5. An animal litter which comprises; a particulate earth substrate in admixture with a water soluble or dispersible polysaccharide selected from the galactomannan gums, wherein the polysaccharide is present in the admixture in a proportion of from 0.02 to 2.5 percent by weight of the earth substrate.

6. An animal litter as claimed in claim 5 wherein the polysaccharide is present in the mixture in from 0.05% to 1% by weight of the earth substrate.

7. An animal litter as claimed in claim 1 wherein the polysaccharide is guar gum or a derivative thereof.

8. An animal litter as claimed in claim 7 wherein the gum is a purified gum.

9. An animal litter as claimed in claim 8 wherein the gum is a hydrophilically augmented derivative.

10. An animal litter is claimed in claim 8 wherein the gum is a pH reduced derivative.

11. An animal litter as claimed in claim 10 wherein the gum comprises an acid having a pKa value of at least 4.

12. A method for producing an animal litter, which comprises; mixing a particulate earth substrate having at least poor clumping ability and earth substrate having at least poor clumping ability and having a particle size substantially in the 10 mesh to 140 mesh USS range with a golactomannan gum in an amount sufficient to increase the clumping ability of the earth substrate.

13. A method as claimed in claim 10 wherein the galactomannan is in particulate form and is dry-mixed with the earth substrate.

14. A method for producing an animal litter, which comprises; admixing a particulate earth substrate with a water soluble or dispersible polysaccharide selected from the galactomannan gums, wherein the polysaccharide is present in the admixture in a proportion of from 0.02 to 2.5 percent by weight of the earth substrate.

* * * * *